Sept. 4, 1956  J. F. BERTSCH ET AL  2,761,425
RECIPROCATORY FLUID ACTUATED DEVICE
Filed June 17, 1952  2 Sheets-Sheet 1

INVENTORS
MEARICK FUNKHOUSER, GEORGE W. JACKSON
AND JOSEPH F. BERTSCH
BY
Willits, Hardman & Jeter
THEIR ATTORNEYS.

Sept. 4, 1956  J. F. BERTSCH ET AL  2,761,425
RECIPROCATORY FLUID ACTUATED DEVICE
Filed June 17, 1952  2 Sheets-Sheet 2

INVENTORS
MEARICK FUNKHOUSER, GEORGE W. JACKSON
AND JOSEPH F. BERTSCH
BY

THEIR ATTORNEYS

United States Patent Office 2,761,425
Patented Sept. 4, 1956

2,761,425

RECIPROCATORY FLUID ACTUATED DEVICE

Joseph F. Bertsch, Mearick Funkhouser, and George W. Jackson, Dayton, Ohio, assignors to General Motors Corporation, Detroit, Mich., a corporation of Delaware Application June 17, 1952, Serial No. 294,022

8 Claims. (Cl. 121—38)

This invention relates to improvements in power transmission devices.

It is among the objects of the present invention to provide an hydraulic actuated power transmission device of light but sturdy construction capable of transmitting reciprocatory power thrusts in either direction.

The power transmission device of the present invention is particularly designed to be used as the actuator for power steering on motor driven vehicles. It is connected to the thrust rod of the vehicle steering apparatus in any suitable manner so that when the steering wheel of the vehicle is turned to steer the vehicle, control mechanism is operated to direct fluid pressure to the power transmission device for actuating the steering apparatus. In an installation of this kind, the power transmitting device is in a location on the vehicle where it is exposed to flying particles such as stones, pebbles or other articles on the road-bed likely to be thrown against it by the tires of the vehicle and thus dent and damage the device so as to render it inoperative.

It is, therefore, a further object of the present invention to provide a power transmission device with a suitable protective casing capable of withstanding impacts of flying stones and the like without being seriously damaged, said casing serving also to provide certain necessary fluid passages whereby the device is made compact and is simplified in its construction detail.

Further objects and advantages of the present invention will be apparent from the following description, reference being had to the accompanying drawings wherein a preferred embodiment of the present invention is clearly shown.

Figure 1:
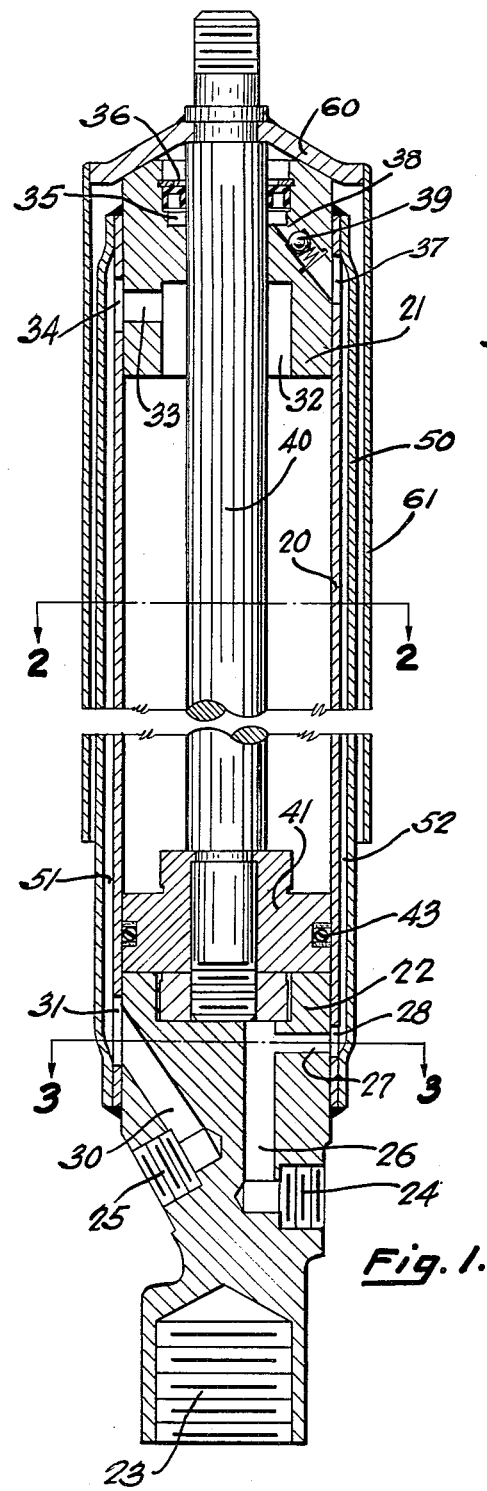
Fig. 1 is a longitudinal, sectional view of the power transmitting device.
Figure 3:
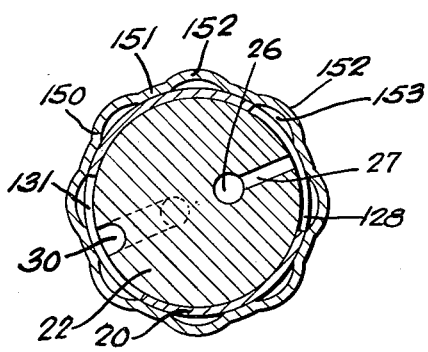
Fig. 3 is a transverse sectional view taken along the line and in the direction of the arrows 3—3 in Fig. 1, and illustrating a modified form of construction.

Referring to the drawings, the cylinder 20 has two end closure members 21 and 22, each extending into a respective end of the cylinder and being welded thereto as shown in Fig. 1. The closure member 22 has an interiorly threaded recessed end 23, providing means for attaching the device to a fixed part of the vehicle upon which the power transmitting device is installed. This end of closure member 22, which extends outside the confines of the cylinder 20, has two interiorly threaded recesses 24 and 25 for receiving attachment connectors on conduits leading from any suitable source of fluid pressure not illustrated. Recess 24 communicates with a duct 26 which terminates in the inner end surface of the closure member 22 and thus communicates with the interior of the cylinder 20 at its one end. A branch passage 27 leads from duct 26 to an opening 28 in the wall of the cylinder embracing the closure member 22. In the modified form shown in Fig. 3, this opening may be in the form of an elongated circumferential slot 128 for purposes to be described. The other recess 25 in the closure member 22 communicates with a duct 30 which connects with an opening 31 in the cylinder wall embracing said closure member. In the modified construction this opening also may be an elongated slot 131 as shown in Fig. 3. Openings 28 and 31 or the corresponding slots 128 and 131 of the modified construction are spaced from the end of the cylinder 20 welded to the closure member 22.

The end closure member 21 welded to the cylinder 20 at its end opposite closure member 22 has a central opening providing a rod guide in which the piston rod 40 is slidably supported. The inner end of the closure member is centrally recessed as at 32, a side opening 33 in the closure member 21 providing a connection between said recess 32 and an opening 34 in the wall portion of the cylinder embracing the member 21. A similar recess 35 is provided in the outer end of the closure member 21, said recess 35 containing the sealing packing 36 of any suitable design and through which the piston rod 40 extends to the exterior of the device. An opening 37 in the cylinder wall communicates with the duct 38 which also communicates with the interior of the packing containing recess 35. A one way check valve 39 permits fluid which may have leaked through the valve guide to flow past valve 39 and through opening 37.

The rod 40 extending through the closure member 21 into the interior of cylinder 20 has a solid piston 41 attached thereto said piston having a suitable peripheral packing or piston ring 43 which substantially prevents leakage past the piston. This piston divides the cylinder 20 into two working chambers one of which has the side opening 33 leading into it, the other having the duct 26 communicating therewith.

To protect the cylinder against being dented by flying stones or the like and thereby rendering the device inoperative, a reenforcing shell 50 envelopes the cylinder tube and thus strengthens and protects it against such damage. This same shell 50 is so constructed that it not only forms a protective casing enveloping the cylinder, but also provides the necessary fluid flow conduits or channels connecting openings 28 and 31 with the respective openings 37 and 34 in the wall of the cylinder. This is accomplished in the manner shown in Fig. 2, by making the shell or casing 50 oval, the narrower cross dimensional portion of said shell or casing 50 fitting upon and engaging the outer cylinder wall surface, the wider cross dimensional area being spaced from the outer surface of the cylinder to form two substantially diametrically opposed conduits or channels 51 and 52 respectively. The contacting areas of the cylinder and shell are welded together, thereby separating the channels 51 and 52 so that they will not communicate with each other. Channels 51 and 52 are closed at each end because the shell 50 has its end portions shaped closely to fit about the cylinder, these ends of the shell being welded to the cylinder to prevent leakage.

Figure 2:
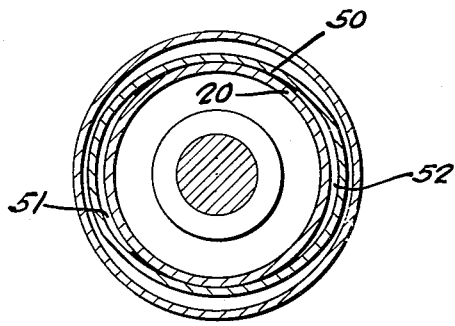
Fig. 2 is a transverse sectional view taken along the line and in the direction of the arrows 2—2 in Fig. 1.

In the modified form of shell construction, the shell or casing 150 has alternate and equally spaced cylindrical portions 151 and humps 152, the circular portions 151 closely fitting the cylinder 20 and being welded thereto, the hump portions 152 each forming a channel 153 closed at each end as is the case in the Fig. 2 construction. In this modified form the elongated openings 128 and 131 in the cylinder wall each communicate with two of the channels 153 and likewise openings 34 and 37 are elongated to communicate with the respective corresponding channels 153. This reduces the possibility of entirely obstructing a fluid channel by ducts caused by flying stones or the like because if one channel is completely obstructed the other may act and it is rather unlikely that both channels be obstructed at the same time.

The rod 40 extending outside the closure member 21 has a disc 60 welded thereto said disc being welded in the one end of an outer shell or casing 61 which, when the device is completely collapsed as shown in Fig. 1, envelopes the cylinder and its surrounding protective shell 50 substantially for the entire length of the working interior of the cylinder. This outer casing 61 provides an additional protective covering for the working cylinder for preventing stone bruises or the like.

Introduction of fluid under pressure into port 24 and its communicating duct 26 will direct this pressure against the piston 41 in the cylinder 20 to move said piston toward the closure member 21. This fluid pressure will have no effect through branch passage 27 and its connected opening 28 leading into channel 52 due to the fact that check valve 39 will permit no exit of the fluid pressure from said channel 52. As the piston moves toward closure member 21, the fluid in this end of the cylinder will be forced through side opening 32 and opening 34 into channel 51 then through opening 31, duct 30 and port 25 back to the low pressure side of the fluid pressure supply, not shown. The rod 40 being attached to the steering member to be operated, will, under the effect of pressure of the piston 41 move the steering member, not shown, in the one direction. To reverse this movement fluid pressure is directed into port 25 and its communicating duct 30, hole 31 into channel 51 thence through openings 34 and 32 into the interior of the cylinder against piston 41 to move it toward the closure member 22. The fluid forced from the cylinder due to this piston movement passes through duct 26 and port 24 to the low pressure side of the pressure supply device. Any fluid leaking past the rod guide into chamber 35 is held back by the packing 36 and caused to flow past the check valve 39, through opening 37 into channel 52 and joins the return flow through duct 26 by entering said duct through opening 28 and branch passage 27.

In a normal power steering system for a motor vehicle, the pump pressure for actuating the power transmitting device is maintained at approximately 700 pounds per square inch. Thus under operating conditions the passages 25, 30, 51, 34, 33, 32 receive and conduct liquid pressure of this value to effect movement of piston 41 toward the closure member 22. Also, under normal operating conditions the maximum pressure in the exhaust lines of the system from the power transmitting device is on the order of 3–5 pounds per square inch, this pressure being only that resulting from normal resistance to flow of liquids in the lines connecting the power transmitting device with an open reservoir.

Fluid under pressure in the recessed area 32 will leak between the rod 40 and its guide formed by the closure member 21 into the recess 35. Whenever the pressure of the fluid in the recess 32 exceeds the maximum low pressure of 3–5 pounds per square inch on the low pressure side of the system, which exists in passage 52, 27, 24 at the time high pressure fluid is conducted in passage 25, 51, 33, 32 leakage fluid in the chamber 35 will pass through the check valve 39 into passage 52 for return to the low pressure side of the system into the reservoir. Thus, the packing 36 may be an inexpensive low pressure seal since it is not required to seal against the high pressure of 700 pounds per square inch of the pressure fluid, and the pressure in chamber 35 will never exceed the maximum low pressure in the low pressure side of the system.

Figure 4:
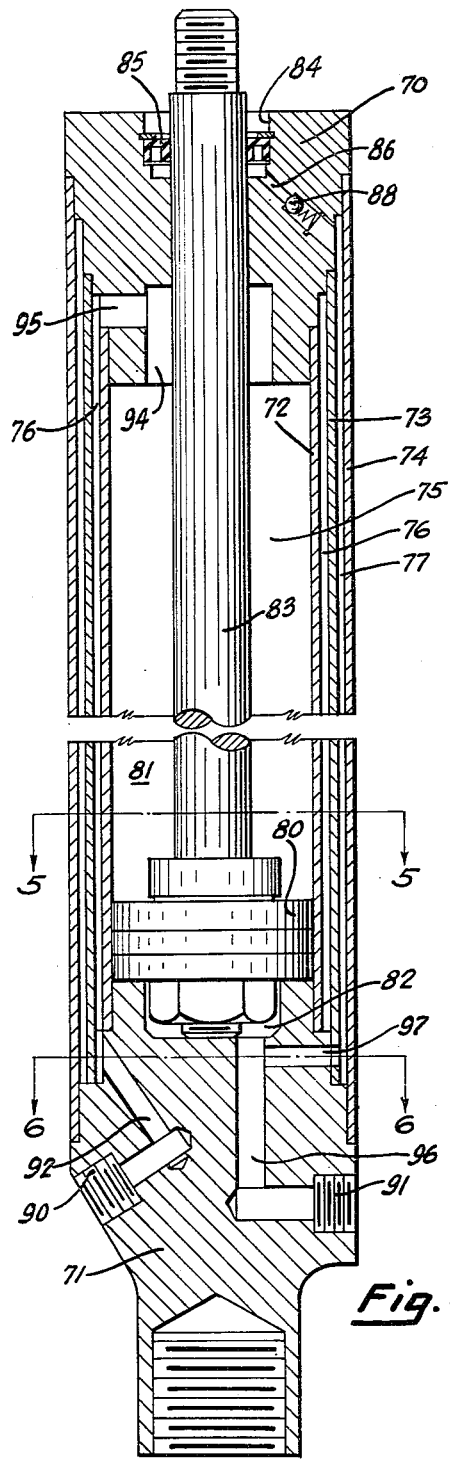
Fig. 4 is a longitudinal sectional view of a modified form of the power transmitting device.
Figure 5:
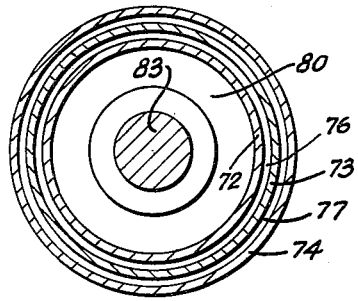
Fig. 5 is a transverse section, taken along the line and in the direction of arrow 5—5 of Fig. 4.
Figure 6:
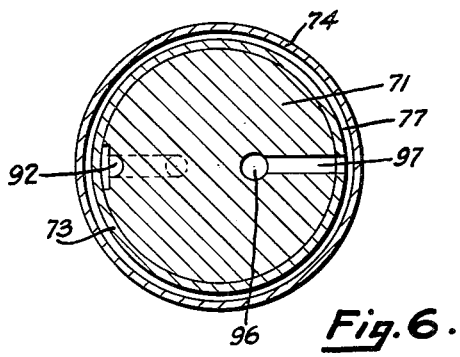
Fig. 6 is a cross section taken along the line 6—6 of Fig. 4.

Referring to Fig. 4 which illustrates a modified construction of the power transmitting device, the numerals 70 and 71 designate two head members between which three tubes 72, 73 and 74 are concentrically supported so as to provide the working cylinder 75 and two annular fluid chambers 76 and 77, each acting as fluid passages during the operation of the device. The working cylinder 72 telescopically embraces a portion of each respective end head 70 and 71 and may be attached to them in any suitable manner. Another annular portion provided on the end heads 70 and 71 are telescopically engaged by the intermediate tube 73 so as to provide the annular chamber 76 between tubes 72 and 73 closed at its both ends by said end heads. The outer tubular member 74 telescopically fits about the annular portion of the end heads 70 and 71 so as to form the annular space 77 between the tubes 73 and 74, said tube 74 being secured to the end heads in any suitable manner, as for instance by welding.

Within the working cylinder 75 there is provided a piston 80 forming a cylinder work chamber on each side of the piston, the one being designated by the numeral 81, the other by the numeral 82. Piston 80 has a rod 83 attached thereto which slidably extends through the end head 70. This end head 70 has a recess 84 containing packing 85 which sealingly surrounds the rod 83. A duct 86 provides communication between the recess 84 beneath the packing 85 and the outer annular chamber 77, this duct 86 having a spring loaded one-way valve 88 which normally yieldably shuts off communication between the packing containing recess and the chamber 77 and at all times prevents fluid from passing from the chamber 77 into the packing containing recess 84.

End head 71 has two interiorly threaded ports 90 and 91, the port 90 being in communication with the inner annular chamber 76 through passage 92 in the head member 71. The inner end of head member 70 is recessed as at 94 this recess being in communication with inner annular chamber 76 through a transverse duct 95 in the end head 70. Thus port 90 is in communication with the one cylinder working chamber 81 through passage 92, inner annular chamber 76 and the passage 95 and recess 94 in the end head 70. Port 91 is in direct communication with the cylinder working chamber 82 through a passage 96 in the end head 71, a branch passage 97 leading from passage 96 providing communication between the passage 96 and the outer annular chamber 77.

When fluid pressure is introduced through port 91 into the passage 96 and into the working chamber 82 of the cylinder, piston 80 will be forced to move within the cylinder in a direction from the end head 71 toward the end head 70. This same fluid pressure will be directed through the branch passage 97 into the outer annular chamber 77. However the one-way ball check valve 88 will not permit this fluid pressure to be directed through duct 86 in end head 70 into the packing containing recess in said end head. As the piston 80 moves toward the end head 70 fluid in the working chamber 81 of the cylinder will be forced therefrom through recess 94 and its communicating passage 95 into and through the inner annular passage 76 and from there through passage 92 and its connected port 90, back to the fluid supply.

When fluid under pressure is directed into the port 90 and through its communicating passage 92 it will pass through the inner annular chamber or passage 76, through passage 95 and recess 94 into the cylinder working chamber 81 thereby urging the piston 80 in the opposite direction or from end head 70 toward the end head 71. Now fluid in the working chamber 82 will be forced through passage 96 and its connected port 91 to the fluid supply. The fluid pressure in working chamber 81 may cause fluid leakage between the sliding connection of the piston rod 83 in end head 70 thereby resulting in an accuation of fluid between the recess beneath the packing 85. This accumulation of fluid under the packing 85 may be directed through duct 86 moving the valve 88 from its seat against the effect of the spring load thereon and thereby cause fluid from the packing containing recess to enter the outer annular chamber 77 and merge with the fluid flowing back to the fluid supply by flowing through the branch passage 97 into the return passage 96 in this instance.

In this modified construction the entire areas of annular chambers 76 and 77 act as fluid passages connecting certain portions of the device for the purpose of transmitting fluid. The outer tube 74 will act as a protector for the intermediate tube 73 and this tube in turn as a protector for the cylinder tube 72 and consequently even though flying stones or any other similar article should dent either tube 74 or 73, fluid flow would not be impeded or interrupted and the two outer tubes would substantially prevent the cylinder 72 itself from being nicked by flying articles.

In both devices the tubular protective covering about the working cylinder not only protects the cylinder against being incapacitated by dents caused by flying articles but also provide fluid passages for the transfer of fluid from one portion of the device to another thereby completely eliminating the cumbersome and complicated plumbing in the form of pipes and connectors exterior of the device usually found in power transmitting devices of this nature, that is, in power transmitting devices used on motor vehicles for power steering.

While the embodiment of the present invention as herein disclosed, constitutes a preferred form, it is to be understood that other forms might be adopted.

What is claimed is as follows:

1. A hydraulically actuated double acting power transmitting device, comprising, a cylinder provided with head members; a piston in said cylinder dividing it into two work chambers, said piston having a rod attached thereto which slidably extends through one of said head members which includes a rod guide and a recess containing a low pressure packing gland for said rod; two ports in one of said head members, each operative as fluid inlet and fluid discharge ports; tubular means surrounding the cylinder and forming separate fluid passages one of which connects one of said ports with the working chamber containing said rod and the other of which connects the other of said ports with said recess and includes a one-way check valve between the last named other port and the recess containing the packing gland to provide for fluid flow from the recess to the last named other port and prevent reverse flow to the recess, and means in the ported head providing a fluid passage between said last named other port and the rodless work chamber.

2. An hydraulically actuated power transmitting device consisting of a cylinder provided with a closure member at each end, one closure member providing attachment means for the device; a reenforcing tube surrounding the cylinder, diametrically opposite, separate longitudinal areas and the complete inside peripheral end areas of said tube contacting and being intimately attached to the cylinder, intermediate areas, not engaging nor attached to the cylinder, forming longitudinal, closed and separate passages; separate fluid conduits in one of said closure members, one conduit communicating with a closed passage in communication with the interior of the cylinder at one end thereof, the other conduit communicating with another closed passage and the interior of the cylinder at the opposite end thereof; a piston in the cylinder, forming two work chambers therein, said piston having a rod attached thereto which extends through one of the closure members, a sealing packing provided in a recess in said last named closure member; and a duct in the said recessed closure member containing a valve providing for unidirectional fluid flow from the sealing packing recess to said other closed passage.

3. An hydraulically actuated power transmitting device consisting of a cylinder provided with a closure member at each end; a reenforcing and protecting tube surrounding the cylinder, said tube having oppositely disposed bulged portions forming separate longitudinal channels between the tube and cylinder, the intermediate engaging areas between said bulged portions and the entire peripheral engaging end areas of the tube and cylinder being welded together whereby said longitudinal channels are completely closed and isolated one from the other; a piston dividing the cylinder into two working chambers, said piston having a rod slidably extending through the one closure member, a packing provided in a recess in said one closure member; a duct in said one closure member connecting one channel with one working chamber; a second duct containing a one way valve in said one closure member, connecting the packing containing recess therein with the other channel; a fluid conduit in the other closure member connecting said other channel with the other working chamber and providing a fluid supply and exhaust connection for the said other working chamber, and a second conduit in said other closure member, providing a fluid supply and exhaust connection with said one channel, the rod and the said other closure member providing means for attachment of the device to power actuated members.

4. An hydraulically actuated power transmitting device consisting of two end heads between which three tubular members are concentrically supported for providing a working cylinder and two surrounding annular chambers closed at their respective ends; a piston in said working cylinder, dividing it into two working chambers, said piston having a rod attached thereto which slidably extends through one of said end heads; two ports in the other end head; a fluid passage in each end head, one connecting the inner annular chamber with one working chamber, the other connecting said inner annular chamber with one of said ports; a fluid passage in the said other end head providing communication between the other of said ports, the other working chamber and the outer annular chamber; a packing in a recess in said one end head, surrounding the piston rod; a duct providing communication between said packing containing recess and said outer annular chamber; and a one way valve normally yieldably closing said duct against fluid flow from said outer annular chamber to said recess.

5. A double acting hydraulically actuated fluid motor, comprising, a work cylinder having end closures, a piston in said cylinder dividing it into two work chambers, said piston having a rod attached thereto slidably extending through one of said end closures, the said one end closure having a rod guide portion and a chamber thereadjacent containing a rod seal member for the rod, one of said end closures having a pair of fluid ports for connection with the two work chambers respectively and usable interchangeably as high pressure fluid supply ports and low pressure fluid discharge ports for supply and discharge of fluid to and from the working chamber, means on the cylinder forming a first fluid passage connecting one of said ports with the rod receiving work chamber of said cylinder, means forming a second fluid passage connecting the other of said ports with the rodless work chamber of said cylinder, and means on the cylinder forming a passage between said packing gland chamber and said second fluid passage and including a valve therein providing for unidirectional fluid flow from the packing gland chamber to said second fluid passage acting as a low pressure fluid discharge passage when said first passage receives high pressure fluid for supply to the rod receiving chamber of said cylinder and preventing fluid flow to said packing gland chamber from said second fluid passage when said second fluid passage receives high pressure fluid for supply to the rodless work chamber with said first fluid passage acting as a low pressure fluid discharge passage.

6. A double acting hydraulically actuated fluid motor, comprising, a plurality of telescopically arranged tubular members supported between two end heads, the inner of said members providing a work cylinder, a piston in said cylinder dividing it into two work chambers, said piston having a rod attached thereto slidably extending through one of said end heads, the said one end head having a rod guide portion and a chamber thereadjacent containing a rod seal member for the rod, the other of said end heads having a pair of fluid ports for connection with the two working chambers respectively and usable interchangeably as high pressure fluid supply ports and low pressure fluid discharge ports for supply and discharge of fluid to and from the said work chambers, means including said tubular members providing a first fluid passage connecting one of said ports with the rod receiving work chamber of said cylinder, means in said other end head forming a second fluid passage connecting the other of said ports with the rodless work chamber of said cylinder and means on the cylinder forming a passage between said packing gland chamber and said second fluid passage and including a valve therein providing for unidirectional fluid flow from the packing gland chamber to said second fluid passage acting as a low pressure fluid discharge passage when said first passage receives high pressure fluid for supply to the rod receiving chamber of said cylinder and preventing fluid flow to said packing gland chamber from said second fluid passage when said second fluid passage receives high pressure fluid for supply to the rodless work chamber with said first fluid passage acting as a low pressure fluid discharge passage.

7. A double acting hydraulically actuated fluid motor, comprising, a work cylinder having end closures, a piston in said cylinder dividing it into two work chambers, said piston having a rod attached thereto slidably extending through one of said end closures, the said one end closure having a rod guide portion and a chamber thereadjacent containing a packing gland for the rod, means forming a first fluid passage extending from one of the end closures to the rod receiving work chamber usable interchangeably as a high pressure fluid supply passage and a low pressure fluid discharge passage, means forming a second fluid passage extending from the said one end closure to the rodless work chamber usable interchangeably as a high pressure fluid supply passage and a low pressure fluid discharge, and means forming a third passage between said packing gland chamber and said second passage and containing a unidirectional flow check valve providing only for fluid flow from the packing gland chamber to said second passage, whereby said packing gland chamber is on the low pressure side of the double acting fluid motor irrespective of which work chamber receives high pressure fluid for actuation of the piston in the cylinder.

8. A double acting fluid motor comprising three concentric casing members in spaced telescopic relation and a piston confined within the inner of said members, said piston having a shaft extending through a bearing at one end of the motor, means providing a fluid chamber beyond said bearing, said chamber being open to the space between the outer and intermediate casing members which provides a fluid conducting passage for exhaust of fluid passing said bearing for re-utilization in said motor, cap means at the end of said motor opposite said bearing having one passageway therein opening to the space between the inner and intermediate concentric casing members so that said last mentioned space may be used as a conduit to one end of the motor and a second passageway therein opening to the space between the outer and intermediate casing members and to the opposite end of the motor, and a one way valve in said fluid conducting passage between the second passageway and the said chamber preventing flow of fluid from the second passageway to the said chamber.

References Cited in the file of this patent

UNITED STATES PATENTS

| | | |
|---|---|---|
| 1,582,022 | Adams | Apr. 27, 1926 |
| 1,816,736 | Miller et al. | July 28, 1931 |
| 1,927,078 | Weeks | Sept. 19, 1933 |
| 2,000,265 | Vickers | May 7, 1935 |
| 2,030,986 | Havill | Feb. 18, 1936 |
| 2,194,209 | Mott | Mar. 19, 1940 |
| 2,246,535 | Playfair | June 24, 1941 |
| 2,274,519 | Barrett | Feb. 24, 1942 |
| 2,291,619 | Grant | Aug. 4, 1942 |
| 2,340,817 | Hurst | Feb. 1, 1944 |
| 2,366,121 | Hurst | Dec. 26, 1944 |
| 2,371,553 | Scott | Mar. 13, 1945 |
| 2,526,236 | Ingres | Oct. 17, 1950 |